(12) United States Patent
Dussardier et al.

(10) Patent No.: US 12,515,374 B2
(45) Date of Patent: Jan. 6, 2026

(54) TEMPERATURE MANAGEMENT OF RUBBER MIXTURES DISCHARGED FROM A CONVERGING CONICAL TWIN-SCREW MIXER

(71) Applicant: COMPAGNIE GENERALE DES ETABLISSEMENTS MICHELIN, Clermont-Ferrand (FR)

(72) Inventors: Bruno Dussardier, Clermont-Ferrand (FR); Aurelien Tournebize, Clermont-Ferrand (FR); Thierry Ablonet, Clermont-Ferrand (FR); Laurent Huc, Clermont-Ferrand (FR); Christophe Egerszegi, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 1000 days.

(21) Appl. No.: 17/436,351

(22) PCT Filed: Feb. 25, 2020

(86) PCT No.: PCT/EP2020/054843
§ 371 (c)(1),
(2) Date: Sep. 3, 2021

(87) PCT Pub. No.: WO2020/178069
PCT Pub. Date: Sep. 10, 2020

(65) Prior Publication Data
US 2022/0161457 A1  May 26, 2022

(30) Foreign Application Priority Data

Mar. 6, 2019  (FR) ..................... 1902280

(51) Int. Cl.
B29B 7/82 (2006.01)
B29B 7/48 (2006.01)
(Continued)

(52) U.S. Cl.
CPC .............. *B29B 7/826* (2013.01); *B29B 7/484* (2013.01); *B29B 7/489* (2013.01); *B29B 7/582* (2013.01);
(Continued)

(58) Field of Classification Search
CPC ............ B01F 2101/2805; B29B 7/582; B29B 7/7495; B29B 7/826; B29C 48/525
See application file for complete search history.

(56) References Cited

U.S. PATENT DOCUMENTS

| 1,370,398 A | 3/1921 | Banbury |
| 2,466,934 A | 4/1949 | Dellenbarger |

(Continued)

FOREIGN PATENT DOCUMENTS

| CN | 1860010 A | 11/2006 |
| CN | 101842204 A | 9/2010 |

(Continued)

OTHER PUBLICATIONS

M.J. Crowley, et al., "Pharmaceutical Applications of Hot-Melt Extrusion: Part I." Drug Development and Industrial Pharmacy, vol. 33, No. 9, Marcel Dekker, Jan. 2007, pp. 909-926.
(Continued)

*Primary Examiner* — Elizabeth Insler
(74) *Attorney, Agent, or Firm* — VENABLE LLP (57) ABSTRACT

A mixing and cooling system (1) includes a mixing and screw-extrusion machine (10) with a mixer (12) having a converging conical twin screw; a ram (30) that moves along the inside of an introduction hopper (24) of the machine; a roller nose system disposed just downstream of an outlet (Continued)

(25) of the mixer to form a sheet (112) of the mixture exiting the mixer; and a mobile sleeve or sleeves (34) that move in a linear movement relative to the outlet. The system also includes a cooling system with a spray installation(s) (102, 104) that delivers water at a predetermined rate to the sheet exiting the machine; a suction installation(s) proportionate to each spray installation; and at least one transport means (114, 116) that transports the sheet in a predetermined direction.

15 Claims, 4 Drawing Sheets

(51) Int. Cl.
 *B29B 7/58* (2006.01)
 *B29C 48/405* (2019.01)
 *B29C 48/525* (2019.01)
(52) U.S. Cl.
 CPC ............ *B29B 7/823* (2013.01); *B29C 48/405* (2019.02); *B29C 48/525* (2019.02); *B29C 2948/92209* (2019.02)

(56) References Cited

U.S. PATENT DOCUMENTS

| | | | |
|---|---|---|---|
| 3,288,077 A | 11/1966 | Meskat | |
| 3,951,389 A | 4/1976 | Porter | |
| 3,975,126 A | 8/1976 | Wireman et al. | |
| 4,131,371 A | 12/1978 | Tynan | |
| 4,300,839 A | 11/1981 | Sakagami | |
| 4,702,608 A | 10/1987 | Garbar et al. | |
| 4,818,113 A | 4/1989 | Patel | |
| 4,824,256 A | 4/1989 | Haring et al. | |
| 5,056,800 A * | 10/1991 | Becker ................ | B29B 7/22 |
| | | | 277/429 |
| 5,183,640 A | 2/1993 | Peter et al. | |
| 5,324,107 A | 6/1994 | Tanaka et al. | |
| 5,593,226 A | 1/1997 | Peter | |
| 5,865,535 A | 2/1999 | Edwards | |
| 5,967,025 A | 10/1999 | Tashiro | |
| 6,022,133 A | 2/2000 | Herring et al. | |
| 7,404,664 B2 | 7/2008 | Borzenski et al. | |
| 7,556,419 B2 * | 7/2009 | Colombo ............... | B29B 7/26 |
| | | | 366/77 |
| 8,517,714 B2 | 8/2013 | Matsumoto et al. | |
| 9,463,581 B2 * | 10/2016 | Yamaguchi ........... | B29C 48/832 |
| 10,124,511 B2 | 11/2018 | Renard et al. | |
| 10,259,147 B2 | 4/2019 | Monnereau et al. | |
| 10,471,627 B2 | 11/2019 | Juillard et al. | |
| 11,351,700 B2 | 6/2022 | Le-Bars et al. | |
| 2005/0226093 A1 | 10/2005 | Yada et al. | |
| 2007/0159916 A1 | 7/2007 | Colombo | |
| 2009/0040867 A1 | 2/2009 | Schulz | |
| 2010/0271901 A1 | 10/2010 | Yamaguchi et al. | |
| 2011/0091596 A1 | 4/2011 | Saiuchi et al. | |
| 2011/0123659 A1 | 5/2011 | Matsumoto et al. | |
| 2015/0360398 A1 | 12/2015 | Monnereau et al. | |
| 2016/0001463 A1 | 1/2016 | Miura | |
| 2017/0165872 A1 | 6/2017 | Renard et al. | |
| 2018/0147746 A1 | 5/2018 | Inoue et al. | |
| 2018/0243945 A1 | 8/2018 | Renard et al. | |
| 2018/0290338 A1 * | 10/2018 | Juillard ................ | B29B 7/584 |
| 2018/0370074 A1 | 12/2018 | Ougier et al. | |
| 2019/0176363 A1 | 6/2019 | Le-Bars et al. | |
| 2019/0193036 A1 * | 6/2019 | Sakamoto ............. | B29B 7/7461 |
| 2022/0152874 A1 | 5/2022 | Dussardier et al. | |
| 2022/0176591 A1 | 6/2022 | Dussardier et al. | |
| 2022/0258379 A1 | 8/2022 | Dussardier et al. | |

FOREIGN PATENT DOCUMENTS

| | | |
|---|---|---|
| CN | 102056722 A | 5/2011 |
| CN | 105365066 A | 3/2016 |
| CN | 108349114 A | 7/2018 |
| DE | 39 20 422 A1 | 1/1991 |
| DE | 10 2016 013 785 A1 | 6/2007 |
| DE | 10 2007 033 355 A1 | 3/2008 |
| EP | 0002131 A1 | 5/1979 |
| EP | 0160124 A2 | 11/1985 |
| EP | 0775568 A1 | 5/1997 |
| EP | 0979714 A1 | 2/2000 |
| EP | 0775568 B1 | 5/2000 |
| EP | 1543930 A2 | 6/2005 |
| EP | 1552914 A1 | 7/2005 |
| EP | 3359362 A1 | 8/2018 |
| EP | 3359361 B1 | 7/2020 |
| FR | 1563077 | 4/1969 |
| FR | 2282993 A | 3/1976 |
| FR | 3001654 A1 | 8/2014 |
| FR | 3045173 A1 | 6/2017 |
| FR | 3051703 A1 | 12/2017 |
| GB | 1125775 A | 8/1968 |
| JP | 5-50425 A | 3/1993 |
| JP | 2003-144884 A | 5/2003 |
| JP | 2006-231582 A | 9/2006 |
| JP | 2006-305976 A | 11/2006 |
| JP | 2009-12463 A | 1/2009 |
| JP | 2010-264606 A | 11/2010 |
| JP | 2011-73428 A | 4/2011 |
| JP | 2014-172230 A | 9/2014 |
| JP | 2015-205402 A | 11/2015 |
| WO | 2005/039847 A1 | 5/2005 |
| WO | 2009/057753 A1 | 5/2009 |
| WO | 2015/190340 A1 | 12/2015 |
| WO | 2016/107527 A1 | 7/2016 |
| WO | 2017/093854 A1 | 6/2017 |
| WO | 2019/162803 A1 | 8/2019 |

OTHER PUBLICATIONS

"Marry", Merriam-Webster, accessed at https://merriam-webster.com/dictionary/marry on Sep. 27, 2024.

International Search Report dated Apr. 3, 2020, in corresponding PCT/EP2020/054843 (3 pages).

B. Vergnes, et al., "Extrusion-Twin-Screw Extrusion Processes", Materiaux—Plastiques et composites, 28 pages (Jan. 2001) with English abstract.

* cited by examiner

TEMPERATURE MANAGEMENT OF RUBBER MIXTURES DISCHARGED FROM A CONVERGING CONICAL TWIN-SCREW MIXER

TECHNICAL FIELD

The invention concerns mixers used in the field of rubber production. More specifically, the invention concerns a cooling function associated with a converging conical twin-screw mixer in order to manage the temperature of rubber products discharged from the mixer.

BACKGROUND

In the field of producing rubber mixtures, twin screw extruders already exist, each having a chassis with common assembled parts. The assembled parts may include, without limitation, a sheath screw assembly (with or without its optional heating and cooling accessories), a drive unit (gearbox and coupling), a main motor, devices for supplying material (for example, dosers or hoppers) or for its treatment (for example, degassing devices), a cutting or shaping device for the extruded material, if applicable, a control cabinet that connects the motor drives, start and safety devices, and control, command, display and measurement devices. There are examples of twin-screw extruders described in the publication "Extrusion—Twin-Screw Extrusion Processes" by Bruno Vergnes and Marc Chapet, published on Jan. 10, 2001 by *Techniques de l'Ingénieur, traité Plastiques et Composites* ("the Vergnes/Chapet reference").

The chassis often includes a manual or assisted sleeve opening device, allowing easy access to the screws for cleaning, inspection and/or maintenance. The most commonly used opening system consists of a slide that slides the sleeve relative to the screws (for example, of the type offered commercially by Colmec and Pomini TDE). There are also "portfolio" opening systems, where the sheath is articulated around a lateral hinge (typically known as the Farrel continuous mixer, or "FCM"). The sleeve screw assembly is the active part and ensures the treatment of the material. The sheath is the outer envelope. The sleeve is temperature regulated by the combination of a heating system, generally electric, controlled by temperature control probes, with a cooling system, usually with water circulation. Inside the sleeve, the two rotating screws swallow the material and move it forward.

The screw mixing and extrusion machines that are usually used are made up of rotors (that is, the screw(s)) and stators (i. e., the sleeves)). Such a machine is described by the publication WO2005039847 which represents an example of a converging conical twin-screw machine with a movable door that closes the outlet. This type of mixer allows the combination of a mixing phase of the raw materials and an evacuation phase of the mixture thanks to a movable door at the outlet (this movable door being arranged at the end of the screw). The movable door is closed and locked during the mixing cycle, preventing the mixture from exiting the machine. When the mixing cycle is complete, the movable door is unlocked and opens. The rotating screws can then bring forward the product (also called "rubber" or "mixture") contained inside the machine.

When mixing rubber products with this type of mixer, the product will undergo significant shearing that will promote the work and homogenization of the product. It is therefore often necessary to manage the temperature rise of the product.

This temperature rise is provided by the shear energy related to the rotation of the screws. This type of twin-screw mixer is therefore often equipped with a water circulation cooling system. Such a system circulates cold water through the screws (and, in some embodiments, through the sleeves) to control the temperature rise of the mixer elements in contact with the product (for example, regulated metal walls). By contact, these elements will cool the product during mixing. However, the cooling efficiency of the product is limited because the product is not always in contact with these elements, and the exchange coefficient at the wall between the product and the element is not very high.

Temperature control is important in order to obtain a mixture with the right properties. In some cases, for example, the addition of vulcanizing agents during the mixing cycle can only be done when the product temperature is below a predetermined value (for example, below 100° C.). Solutions exist for temperature control using water spray rubber sheet cooling systems (see Korean publication 10-0513504 and the publication FR3045173). These types of systems are combined with an external roller mixer to produce a rubber sheet of limited thickness. This sheet then circulates through motorized belts and passes under water sprayers and extractor hoods that will allow a rapid lowering of the temperature.

Thus, the invention discloses a water spray cooling system combined with a mixer equipped with a converging conical twin-screw mixer. The use of such a system allows the temperature, and therefore the properties, of the product to be controlled at the end of the cycle as soon as it exits the mixer. This type of mixer can be equipped with a roller nose system at the outlet that will allow the product to be discharged as a sheet.

SUMMARY

The invention concerns a mixing and cooling system that performs mixing cycles in order to manage temperatures of rubber mixtures exiting a converging conical twin-screw mixer with a fixed frame that supports sleeves in which two screws are mounted at an angle between an opening located upstream of the sleeves, where an introduction hopper of the machine feeds the screws, and an outlet downstream of the sleeves, where the mixer discharges the mixture at the end of a mixing process of the mixing cycle, one or more motors that rotate the two screws in the sleeves during the mixing process, and one or more movable doors provided at the outlet that allow, during the mixing process, the discharge and shaping of a rubber mixture. The system includes a mixing and extrusion machine having the mixer; a ram with an inner surface having a shape that is complementary to an outer contour of the two screws, the ram moving along the inside of an introduction hopper; a roller nose system with two counter-rotating rollers arranged just downstream of the outlet to form a sheet of the mixture discharged from the mixer; and one or more mobile sleeves that are arranged top-down towards the outlet, the mobile sleeves having mobile elements that move in a linear movement with respect to the outlet in order to adjust a predetermined space between the sleeves and the screws. The system also includes a cooling system having at least one spray station that delivers water at a predetermined rate to a sheet emerging from the machine; at least one suction station proportionate to each spray station that draws air at a predetermined air flow rate; and at least one transport means that transports the sheet in a predetermined direction corresponding to a cooling process performed by the cooling system.

In some embodiments, each spray station includes one or more spray booms positioned at the respective spray station, each boom being in communication with a water and air supply source in order to supply water and air to one or more nozzles at a predetermined water flow rate and air pressure.

In some embodiments, the cooling system also includes a detection system configured to detect, throughout the mixing and cooling cycle, a real water flow rate, a real intake air flow rate, and the presence at the correct pressure of the atomized air droplets in order to generate one or more corresponding signals; and a monitoring system configured to perform at least one of prediction, comparison and adjustment based on the signals received from the detection system.

In some embodiments, the movable doors include sliding shutters installed relative to the outlet so that the sliding shutters move linearly between a closed position, in which the sliding shutters prevent the mixture from exiting the mixer, and an open position, in which the sliding shutters prevent the mixture from escaping through the sides of the two counter-rotating rollers so as to force the mixture to pass between the two rollers and to form the sheet of a predefined thickness and width discharged from the mixer.

In some embodiments, the screws are mounted in the mixer so that the crests of each screw thread contact tangentially the surfaces of the opposite screw so that the screws remain substantially in contact with each other when rotating the screws at an angle and at a center distance that facilitates self-cleaning.

In some embodiments, the screws are selected from interpenetrated and conjugated profiles, including interpenetrated co-rotative profiles with conjugated profiles.

In some embodiments, the sleeves include cooling channels that manage the temperature of the mixture during the mixing cycle.

The invention also concerns a mixing process of the type including a mixing cycle carried out by the disclosed system. The mixing cycle includes at least one mixing process performed by the machine of the system, and the mixing process includes the following steps:
  a step of rotating the screws forward with the movable doors closed;
  a step of introducing the mixture into the machine, during which the screws continue to rotate and the movable doors remain closed;
  a step of mixing a rubber mixture from the machine;
  a step of emptying the machine, during which the movable doors open to discharge the mixture from the machine outlet and during which the screws continue to rotate until the mixer is empty; and
  a step of shaping the mixture discharged from the mixer in the form of a sheet in order to deliver the mixture to a downstream process.

In some embodiments of the process, the step of introducing the mixture of the mixing process includes introducing raw materials to form the mixture.

In some embodiments of the process, the step of introducing the mixture of the mixing process includes the introduction of one or more masterbatches.

In some embodiments of the process, the process also includes at least one cooling process performed by the cooling system of the system after the step of shaping the mixture discharged from the mixer, the cooling process including the following steps:

a step of circulating the sheet exiting the machine in a direction of treatment by at least one spray station;
  a step of spraying the sheet during the circulation of the sheet in the vicinity of a spray station; and
  a step of evacuation of the air containing the evaporated water.

In some embodiments of the process, the cooling process also includes the following steps:
  a step of detecting a water flow rate reached at an elapsed time during the mixing and cooling cycle;
  a step of using the detected flow to predict temperature and water addition values for the mixture at the end of the current mixing and cooling cycle;
  a step of comparing target and predicted values of temperature and water addition;
  a step of adjusting the actual water flow rate so that the properties of the mixture reach the desired properties for the mixture; and
  a step of evacuating the sheet from the system when the properties of the mixture reach the desired properties for the mixture.

In some embodiments of the process, the mixing process also includes a step of reintroducing the mixture into the mixer, during which the mixture exiting the mixer is returned to the mixer through the introduction hopper.

In some embodiments of the process, the mixing and cooling processes are carried out simultaneously.

In some embodiments of the process, the movable doors are in the closed position at the beginning of the mixing cycle and in the open position at the end of the mixing cycle; and the mobile sleeves are in the open position at the beginning of the mixing cycle and in the closed position at the end of the mixing cycle.

Other aspects of the invention will become evident through the following detailed description.

BRIEF DESCRIPTION OF THE DRAWINGS

The nature and various advantages of the invention will become more obvious when reading the following detailed description, in conjunction with the attached drawings, in which the same reference numbers refer everywhere to identical elements, and in which.

DETAILED DESCRIPTION

Figure 1:
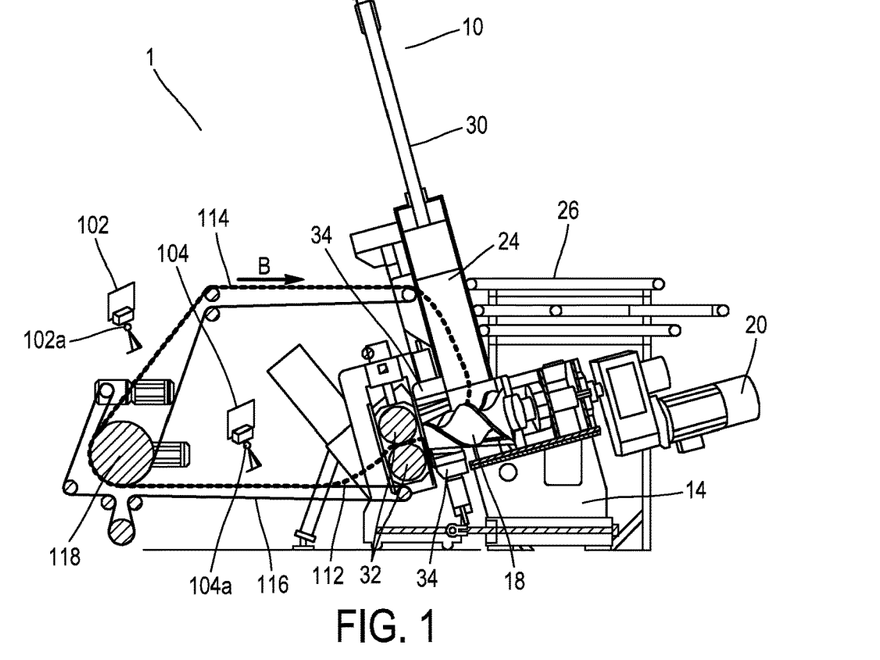
FIGS. 1 and 2 show perspective views of a mixing and cooling system of the invention during a mixing cycle performed by the system.
Figure 2:
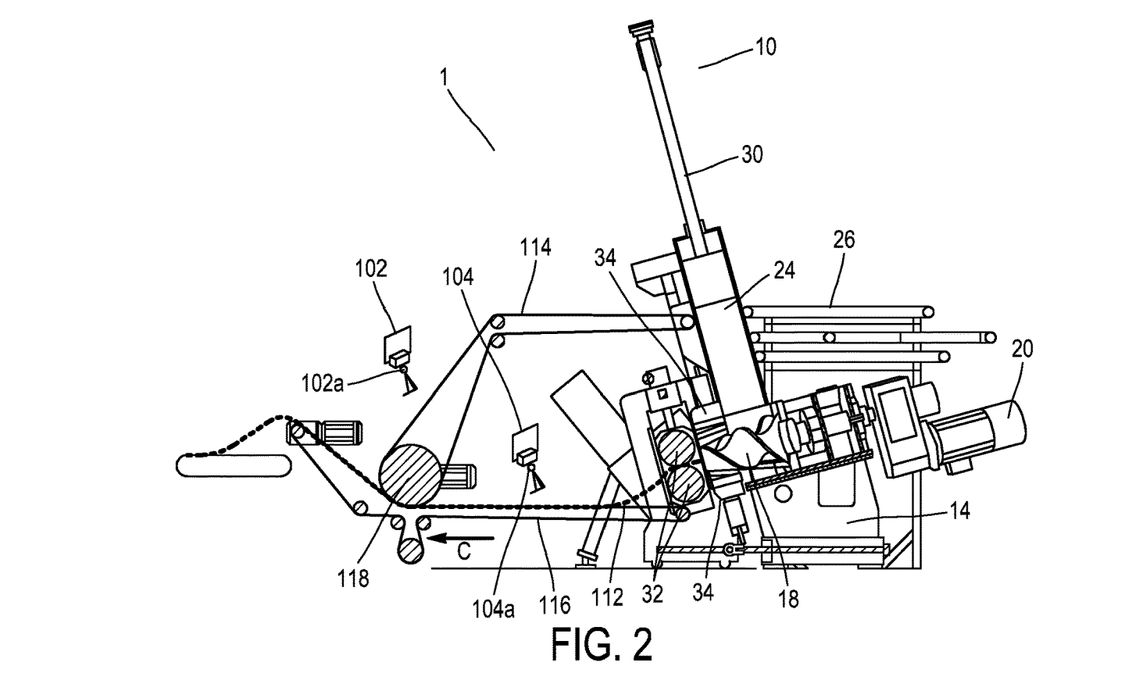

Referring now to the figures, in which the same numbers identify identical elements, FIGS. 1 and 2 represent an embodiment of a mixing and cooling system (or "system") 1 of the invention. The system 1 includes a mixing and extrusion machine (or "machine") 10 (represented by FIGS. 3 and 4) and a cooling system as described in the Publication FR3045173 (the cooling system is described below in relation to FIGS. 1 and 2). The machine 10 and the cooling system are combined so that the system 1 can perform mixing and cooling processes in a single station.

Figure 3:
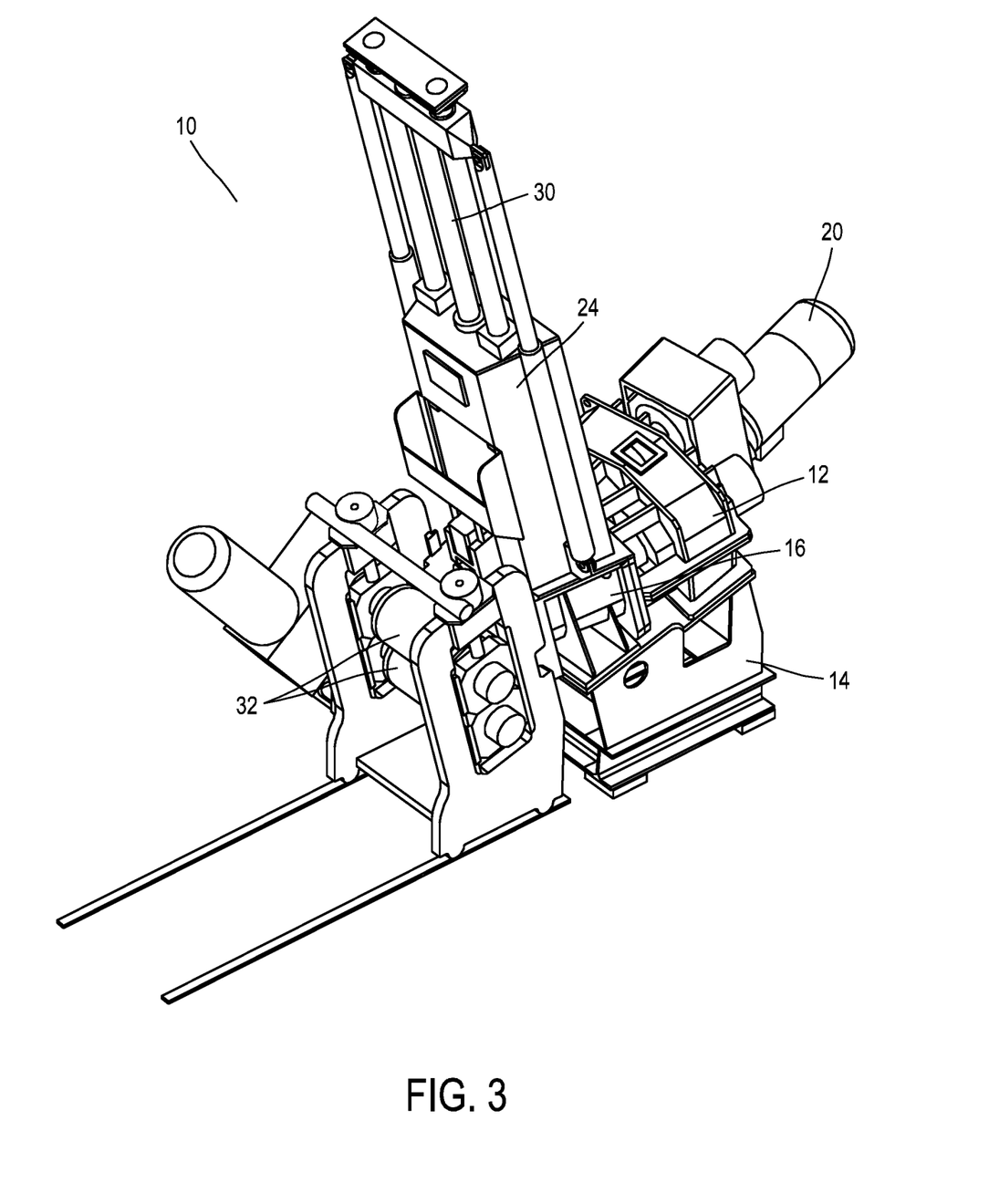
FIG. 3 shows a perspective view of a mixing and extrusion machine of the system of FIGS. 1 and 2.
Figure 4:
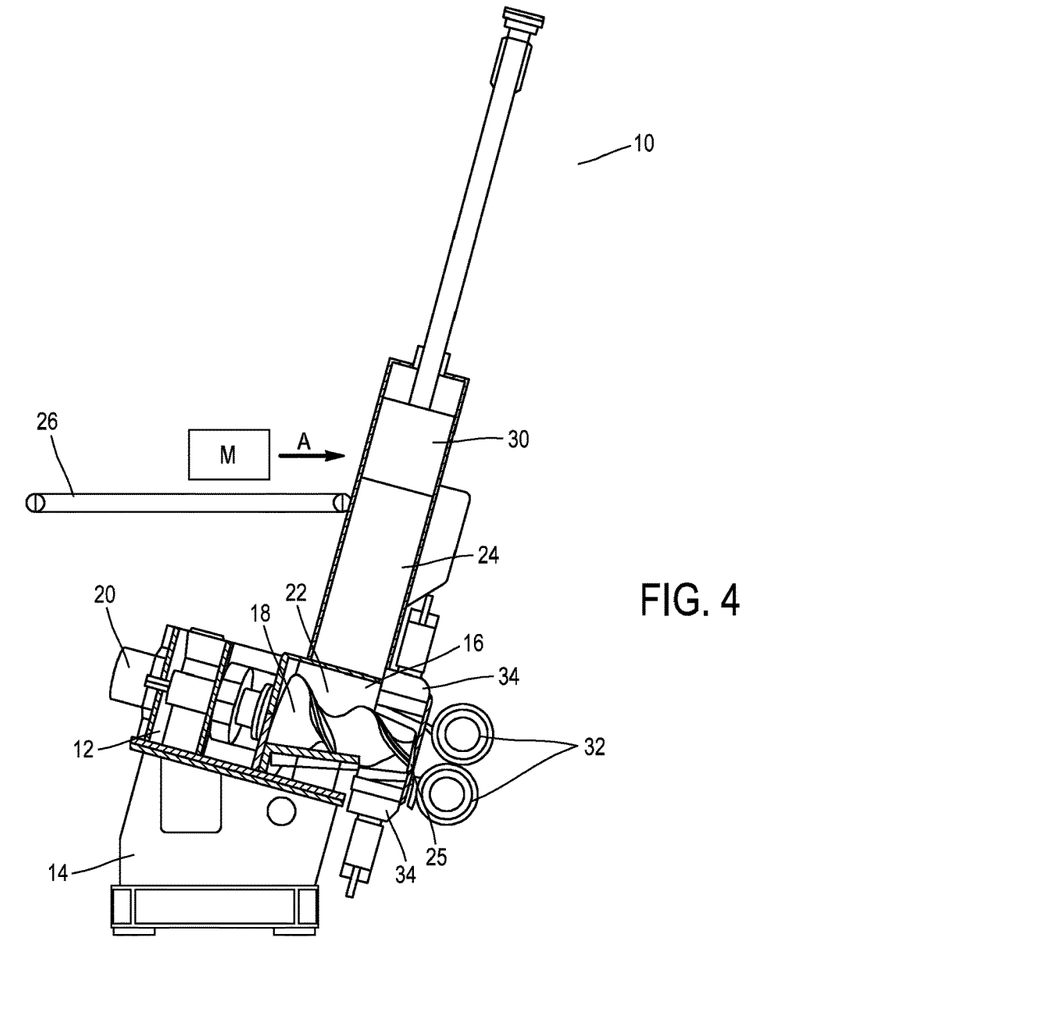
FIG. 4 shows a lateral view, in partial section, of the machine of FIG. 3.

FIGS. 3 and 4 represent an embodiment of the machine 10 that is part of the system 1 of FIGS. 1 and 2. The machine 10 includes a converging conical twin-screw mixer (or "mixer") 12 suitable for rubber materials. The mixer 12 includes a fixed frame 14 that supports fixed sleeves (or "sleeves") 16 in which the two screws 18 are mounted. One or more motors 20 rotate the two screws in the sleeves 16 during a mixing cycle. An upper surface of the fixed frame 14 includes guides (not shown) on which the sleeves 16 (without the screws 18) are able to move in translational movement. The mixer 12 is chosen from commercially available mixers, including those of the type disclosed by the U.S. Pat. No. 7,556,419 and proposed by Colmec S.p.A. In an embodiment, this type of mixer realizes mixing and discharges with Archimedes screw type screws.

The machine 10 can include an optional conveyor known to the skilled person (for example, the belt 26 shown in FIG. 4) to be used to introduce components through the introduction hopper 24. The components are represented by the mixture M being transported by the belt 26 (see arrow A in FIG. 4). These components can be all types of components that are necessary for the manufacture of rubber products. During a mixing cycle, the belt 26 (or other equivalent means) is used to successively introduce the raw materials and other necessary ingredients according to a predetermined recipe.

The screws 18 are mounted in the sleeves 16 at an angle between an opening 22 located upstream of the sleeves (where an introduction hopper 24 of the machine 10 feeds the screws 18), and an outlet 25 located downstream of the sleeves (where the mixer 12 discharges the mixture at the end of the mixing cycle). The sleeves 16 can include cooling channels that are known to manage the temperature of the mixture. The contour of an inner surface 16a of the 16 sleeves is predefined, which makes it possible to determine a distance between each thread and the inner surface of a corresponding sleeve, and thus the shear rate at the inner surface of the sleeves. Similarly, the screw threads contact tangentially the inner surfaces of the sleeves, preventing any retention of mixing material on these surfaces.

In an embodiment of the screws 18, the screws are chosen from profiles known for their self-cleaning nature, including interpenetrated and conjugated profiles (and particularly interpenetrated co-rotating profiles with conjugated profiles). In other words, the screws can be in substantial contact with each other at an angle and at a center distance that facilitates self-cleaning. The screws are said to be "substantially in contact" when the screws can be cleaned by friction, or when the two screws face each other with such a small gap between them that an extruded material cannot remain attached to the surfaces of the screws. The screws are said to rub against each other, or to be "self-cleaning", when the materials transported in the channel of one of the screws cannot remain in that channel for more than one revolution of the screw. As a result, the material undergoes much more movement in the downstream direction, parallel to the screw axis, than in a lateral direction, perpendicular to the axis. Examples of self-cleaning screws are disclosed by patents EP0160124B1, EP0002131B1, U.S. Pat. Nos. 4,300,839, 4,131,371, and 6,022,133 and by publication WO2016/107527.

Figure 5:
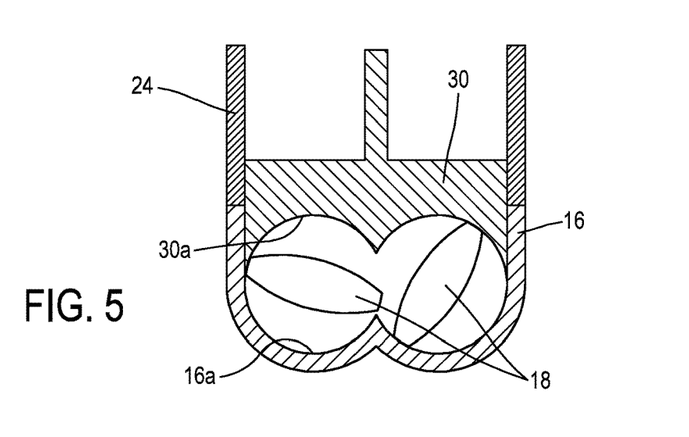
FIG. 5 shows a front view, in partial section, of a ram of the machine of FIGS. 3 and 4 in the lowered position.

With further reference to FIGS. 1 to 4 and also to FIG. 5, the machine 10 also includes a ram (or equivalent mobile presser) 30 that moves inside the introduction hopper 24. The ram 30 is similar to rams used during mixing cycles and processes of the type realized by Banbury type internal mixers (disclosed, for example, by U.S. Pat. Nos. 1,370,398 and 7,404,664). As with internal mixers, the ram 30 is used to press the mixture and to exert pressure on the mixture during production. Thus, the ram 30 allows the transmission of more energy and shear to the mixture and thus improve the working of the rubber.

Referring further to FIG. 5, an inner surface 30a of the ram 30 has a shape that is complementary to an outer contour of the two screws 18. The guidance of the ram 30 is done between a raised position (represented by FIG. 4), where the two screws 18 remain accessible to introduce the mixture, and a lowered position (represented by FIG. 5), where the inner surface 30a of the ram 30 forms an upper part of the mixer 12. The guidance of the rammer 30 is effected by sliding systems as known on Banbury rams (driven, for example, by cylinders that can be pneumatic, hydraulic or their equivalents). Thus, in its lowered position, the ram 30 leaves only a very small clearance between the crests of the threads of the screws 18 and its inner surface 30a.

Referring also to FIGS. 1 to 4, the machine 10 includes a roller nose system. Examples of roller nose systems are disclosed by patents FR1563077, FR2282993 and FR3001654. An example of a roller nose system used at the outlet of a converging conical twin-screw extrusion machine is disclosed by patents JP4294005 and U.S. Pat. No. 8,517,714.

A roller nose system includes two counter-rotating rollers 32 arranged just downstream of the outlet 25 in order to form a sheet of the mixture discharged from the mixer 12. The roller nose system may also include an optional control means (not shown) to control the feeding speed of the mixture to the rollers. The rotation of the rollers 32 is managed by the amount of the mixture discharged by the mixer 12 (detected, for example, by a proximity sensor, by a pressure sensor or by an equivalent device).

Figure 6:
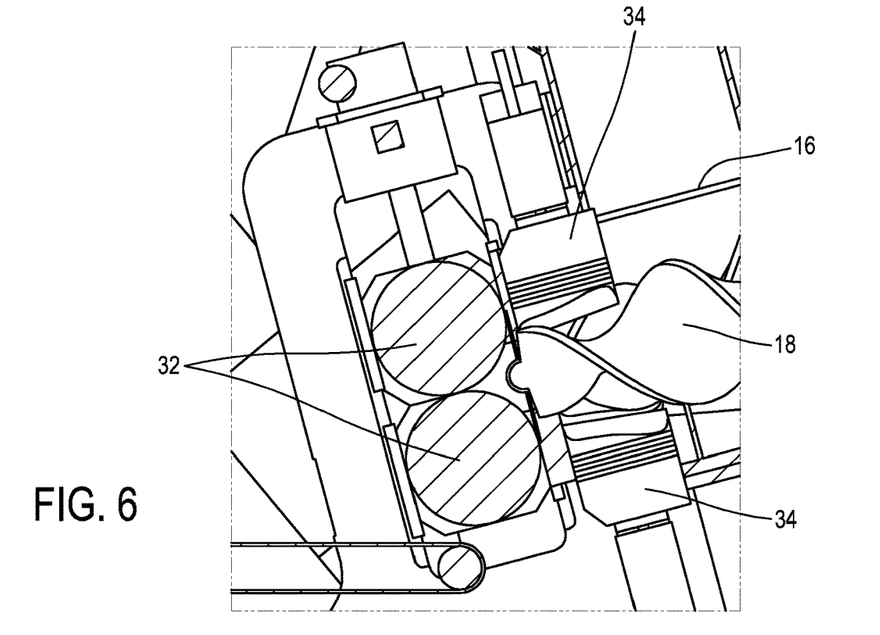
FIG. 6 shows a partial cross-sectional side view of a mixer of the machine of FIGS. 3 and 4 with mobile sleeves.

Referring further to FIGS. 1 to 4 and also to FIG. 6, the machine 10 combines the benefits of the screws 18 and the ram 30 with one or more mobile sleeves such as the mobile sleeves 34 shown in FIG. 4. It is understood that other modes of known mobile sleeves may be used (for example, left-right and angled modes) (see also examples disclosed by publications WO2009057753 and JPH0550425). The mobile sleeves 34 include mobile elements that adjust a predetermined space between the sleeves 16 and the screws 18. Each mobile sleeve has a support surface with a predetermined surface area depending upon the elasticity of the mixture. It is understood that mobile sleeves with different surface areas are interchangeable to ensure the use of the machine without having to replace it.

The embodiment shown includes two mobile sleeves 34, but it is understood that only one mobile sleeve (or other equivalent element) or several mobile sleeves (or other equivalent elements) can be integrated (for example, in top-down mode, left-right mode or angled mode). The mobile sleeves 34 adjust the space between the sleeves and the screws so as to facilitate the flow of the mixture inside the mixer 12, thus allowing the duration and degree of mixing of the mixture to be adjusted.

The two screws 18 circulate the mixture from an upstream side (next to the introduction hopper 24) to a downstream side where the mobile sleeves 34 of the machine 10 are installed. The mobile sleeves 34 are installed in relation to the outlet 25 of the mixer 12 so that, in an open position, they allow the mixture to flow to the rollers 32 of the roller nose system. The mobile sleeves can move in an alternative or random manner so as to reduce the space between the screws and the support surface in a random manner, creating downstream-to-upstream mixing flows and preferably above or below. For example, in a manner of using the machine 10, the mobile sleeves 34 are mostly in the open position at the beginning of the mixing cycle when the mixture has a high viscosity (to promote the mixing flow), and they are mostly in the closed position at the end of the mixing cycle when the mixture has a lower viscosity (to promote mixing). The guidance of the mobile sleeves 34 is effected by known systems (for example, actuated by cylinders that can be pneumatic, hydraulic or their equivalents). The linear movement of the mobile sleeves 34 is controlled by the amount of the mixture exiting the mixer 12 (detected, for example, by a proximity sensor, by a pressure sensor or by an equivalent device).

The use of mobile sleeves allows, from the beginning of the mixing cycle, to have a large air gap and therefore a low pressure drop despite high viscosity. The product to be extruded or mixed passes through the spaces left by the difference in volume between the screw and its sleeves. These spaces, and more particularly the clearance left between the crests of the screw threads and the crests of the sleeve threads (if the sleeve has no threads, the smallest inside diameter is considered), are important for working the product, for its forward speed and for any pressure inside the machine. The product that is subjected to a very high pressure at the end of the screw will seek to move to areas where the pressure is lower. When the product moves through the machine, it will undergo significant shearing, which will promote the work and homogenization of the product. The product can thus be worked as from the beginning of the cycle.

Figure 7:
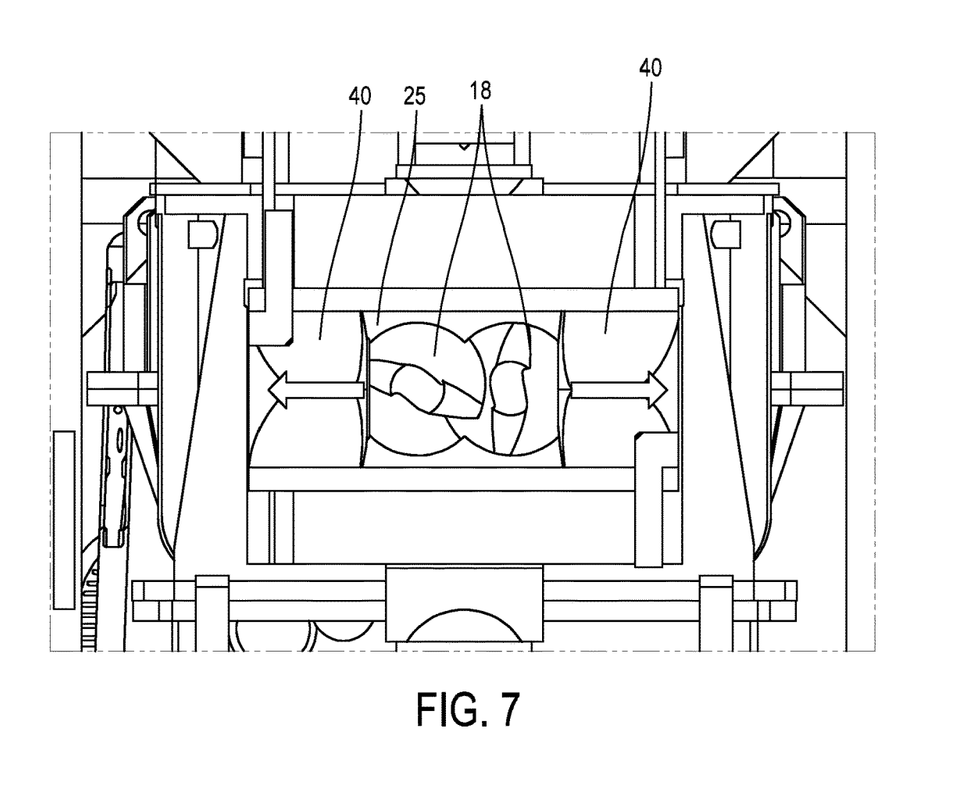
FIG. 7 shows a partial front view of the machine of FIG. 6 with sliding shutters in the open position during a mixing process.

In an embodiment of the machine 10, the movable doors include sliding shutters 40 as shown in FIG. 7. The sliding shutters 40 are inserted between the rollers 32 and a front panel of the mobile sleeves 34 of the machine 10. The sliding shutters 40 include movable elements that regulate the flow of the mixture from the mixer 12. The sliding shutters 40 are installed relative to the mixer outlet 25 so that, in a closed position (not shown), they prevent the mixture from leaving the mixer 12 (for example, to promote mixing when the mixture has a lower viscosity). In an open position (shown in FIG. 14), the sliding shutters serve as "ears" for the rollers 32, that prevent the mixture from escaping through the sides of the rollers 32. Thus, the mixture is forced to pass between the two rollers and will be calendered in the form of a thin sheet of a predefined width by opening the sliding shutters.

Referring again to FIGS. 1 and 2, the system 1 allows the partial or total opening of the sliding shutters 40 to allow the extrusion of part or all of the mixture into a continuous sheet (or "sheet") 112. The sheet 112 can be fed onto conveyor belt systems as described in patent FR3045173 before returning to the mixer 12 via the introduction hopper 24 during a mixing cycle.

The system 1 allows the sheet 112 to be transported to a cooling system as described in publication FR3045173. The cooling system of the system 1 has at least one upper spray station 102 and at least one lower spray station 104. To control a temperature and an addition of water to a rubber mixture, each spray station 102, 104 integrates at least one spraying station and at least one suction station. The spray system sprays water that is discharged after evaporation in a controllable way by the suction system.

The cooling system circulates the continuous sheet 112 that emerges from the rollers 32 of the machine 10 (see FIG. 1). The circulation of the sheet 112 is carried out on a predetermined movement path that includes one or more continuous means of transport (for example, one or more conveyor belts or equivalent means of transport). In the embodiment of FIG. 1, the predetermined movement path is formed at least in part by a continuous belt 114 disposed at the upper spray station 102 and another continuous belt 116 positioned at the lower spray station 104. The belts 114, 116 are driven by at least one large diameter roller 118. One or more auxiliary rollers can complete the transport of the belts 114, 116 as known in the art.

Although the belts 114, 116 are represented as separate means of transport, a single continuous belt can replace them. It is understood that the continuous movement path is not limited to continuous belts and that other means of transport may replace them without departing from the scope of the described invention. The continuous movement path can remain "endless" (i.e., uninterrupted) during at least one ongoing mixing and cooling cycle and may remain continuous over one or more successive cycles. Depending on the properties of the selected rubber mixture, the speed of the continuous belts 114, 116 can be adjusted during a mixing cycle or between successive cycles as required.

The cooling system may include a spray station that sprays water along at least part of the sheet 112 when the sheet travels the predetermined path. The spray system may include one or more upper spray booms 102a positioned at the upper spray station 102 and one or more lower spray booms 104a positioned at the lower spray station 104. As used here, the terms "spray booms" and "booms" are used interchangeably.

Each boom 102a, 104a is in communication with a water and air supply source (not shown) for supplying water and air to one or more respective nozzles (not shown), which nozzles may be identical or may have a variety of nozzle sizes and types. In some embodiments, each boom is equipped with a spray bar of nozzles that are linearly arranged and evenly spaced along a common axis passing through all or part of the continuous sheet 112 (for example, along at least part of the width of the sheet). In some embodiments, each boom nozzle delivers water at the same pressure and flow rate. In such embodiments, in the event of a nozzle malfunction, the circulation of fluids (e. g., water and air) is stopped and prevents the introduction of excess water into the rubber mixture.

After the fluid flow has stopped, the properties of the rubber mixture can be checked manually or automatically before resuming production. For example, an actual temperature and/or an actual addition of water of the mixture exiting the machine 10 can be detected at the time the circulation stops, which time is determined during the mixing and cooling cycle. At this moment, if the detected temperature and/or water addition values have not reached respective target values for this elapsed time, it is unlikely that the mixture will reach predicted temperature and/or water addition values at the end of the mixing and cooling cycle. Thus, between successive mixing and cooling cycles, the fluid flow rate can be adjusted.

It is understood that the booms should be configured to deliver a predetermined flow rate of spray water as determined for the selected mixing and cooling cycle. It is understood that the water flow rate may be changed between successive mixing cycles, and that during some mixing cycles, one boom may deliver a different water flow rate than that delivered by another boom in the same system.

The cooling system may include a suction system to suction in the water particles generated by the booms 102a, 104a. For example, at least one exhaust hood (not shown) can be positioned downstream of each respective boom 102a, 104a and in communication with a suction source. In some embodiments, a conduit can apply suction to each hood with a suction rate that represents a volume of air suctioned in over an elapsed time. The suction creates an air circulation in a direction opposite to the direction of circulation of the continuous sheet 112. Thus, the belts 114, 116 transport the continuous sheet 112 while the hoods apply suction in opposite directions.

The addition of water through the booms 102a, 104a loads the ambient air with moisture. The air containing the evaporated water is suctioned in so as to prevent the introduction of water into the mixture.

The cooling system may also include a detection system that includes at least one flow sensor. The detection system is used to perform the detection and generate one or more signals indicating the actual water flow rate. The detection system includes sensors to detect an actual flow rate delivered by each boom 102a, 104a. The detection system may also include a suction air flow sensor at each hood to check the suction air flow. Such verification may include determining that a detected air flow rate meets the predetermined air flow parameters for the specified rubber mixture (being the mixture exiting the mixer 12 of the machine 10). Each intake air flow sensor can generate one or more signals that are indicative of the actual air flow detected.

The detection system may also include at least one sensor that is used to detect a presence at the correct pressure of the atomized air droplets. The system generates one or more pressure indicator signals (value indicated in the nozzle manufacturer's documentation). The detection can be continuous or intermittent so that a real-time real time water flow rate can be determined at any time during the current mixing and cooling cycle (i.e., the mixing and cooling cycle performed at the time of detection).

The cooling system may also include a monitoring system that is configured to receive the detected signals (for example, water flow signals and/or intake air flow signals and/or presence at a specified pressure) and to send one or more proportional control signals. Monitoring can be continuous or intermittent so that the control signals make a real-time adjustment of the water flow and/or intake air flow in response to the actual flows detected at any time during the current mixing and cooling cycle. The monitoring system can be programmed to stop spraying when a fault is detected in the cooling system.

The monitoring system may include at least one programmable controller communicating with the spray and/or suction system. The programmable controller may have, programmed within it, data established for a plurality of rubber mixtures each with a unique mixing and cooling cycle setting. The data may include water flows and air flows established in such a way that the actual water flow detected and the actual air flow detected can be compared respectively. Additional data include at least a predetermined water flow rate to be delivered by each boom during a mixing and cooling cycle, a target temperature of the rubber mixture and a target addition of water to the rubber mixture after an elapsed time. Using this data, the monitoring system can be configured to receive the detected signals and perform a corresponding adjustment. All or part of the surveillance system can be housed in a central control center. All or part of the monitoring system can be controlled remotely via a network.

The cooling system can be used in different ways to cool the mixture while maintaining its desired properties. In some modes of execution, one or more vulcanization products (for example, sulfur) may be added to the mixer 12 during the circulation of the continuous sheet 112. In one embodiment, the target temperature and the target addition of water are attained before adding the vulcanization products. Cycle times can be shortened while maintaining the beneficial properties of the selected rubber mixture, allowing for optimal productivity.

A mixing process of the type including a mixing cycle performed by the system 1 includes different processes that are performed by the system 1. In an embodiment of a mixing cycle performed by the system 1, the mixing cycle includes at least one mixing process performed by the machine 10. One or more mixing processes can be envisaged during a complete mixing cycle.

The mixing process includes a step of rotating the screws 18 forward with the movable doors closed. It is understood that movable doors may include the sliding shutters 40 or other equivalent movable doors. During this step, the rotating screws cause the product to move downstream of the mixer as soon as the mixture (or raw materials) is introduced into the machine 10.

The mixing process also includes a step of introducing a mixture into the machine 10. The introduction of a mixture can be achieved by introducing the ingredients of the mixture on the belt 26 or by equivalent means.

During the step of introducing the mixture, a mixing process can be carried out by introducing, into the empty machine 10, the different raw materials that are necessary for the production of the product, including, without limitation, an elastomeric material (for example, natural rubber, synthetic elastomer and combinations and equivalents thereof) and one or more ingredients, such as one or more processing agents, protective agents and reinforcing charges. Raw materials may also include one or more other ingredients such as carbon black, silica, oils, resins and cross-linking or vulcanization agents. All ingredients are introduced in varying quantities depending on the desired performance of the products obtained from the mixing processes (for example, tires).

During the step of introducing the mixture, a mixing process can also be carried out by introducing, into the empty machine 10, an already mixed product that does not contain all the ingredients of the recipe (called a "masterbatch"). For example, resins and curing agents are not present in the masterbatch. These ingredients, which make mixing difficult, can be added to the mixer 12 to complete mixing. In this case, either the masterbatch is recovered hot from an upstream mixer (such as an internal mixer or an external mixer), or the masterbatch is cold because it has been manufactured and packaged several hours or even several days in advance.

During the step of introducing the mixture into the machine 10, the introduction means (either the belt 26 or another equivalent means) is used to introduce successively the raw materials and other necessary ingredients according to a predetermined recipe. In one embodiment, the elastomeric material is introduced into the machine 10, followed by the introduction of reinforcing fillers such as carbon black or silica, oils, resins and vulcanizing agents during the mixing process.

During the step of introducing the mixture (either raw materials or masterbatch(es)), the screws 18 continue to rotate and the movable doors remain closed.

In an embodiment of the mixing process, the mixing process also includes a step of turning the screws 18 in reverse with the movable doors closed. During this step, the screws 18 rotate in a direction opposite to the direction of rotation during the step of rotating the screws forward.

In an embodiment of the mixing process, the mixing process also includes a step of reintroducing the mixture into the mixer 12. During this step, the mixture exiting the outlet 25 of mixer 12 can be returned to the mixer 12 through the introduction hopper 24 during a mixing cycle. The reintroduction of a mixture can be achieved by further feeding the mixture onto the belt 26 or by equivalent means (for example, by the belt 114 of the cooling system).

In an embodiment of the mixing process, the screws 18 continue to rotate and the movable doors remain closed during the mixing introduction stage. In this mode, the ram remains in its raised position, the rollers 32 remain on standby and the mobile sleeves 34 remain in their open position (i.e., with the space between the sleeves and the screws at maximum) during this step. In embodiments that include a step of reintroducing the mixture, the screws 18 continue to rotate, the ram 30 remains in its raised position during this step and the rollers 32 are rotating. The movable doors remain at least partially open during this step. The mobile sleeves can remain in an open position during this step, or they can be in another position (for example, a closed position or a partially closed position).

In an embodiment of the mixing process, the mixing process also includes a step of lowering the ram after the step of introducing the mixture. During this step, the screws 18 continue to rotate and the rollers 32 remain on standby.

In an embodiment of the mixing process, the mixing process also includes a step of partially closing the mobile sleeves 34 (either the two mobile elements simultaneously or the two mobile parts alternately). Partial closing of the mobile sleeves may refer to their reciprocating movement or their simultaneous movement. During this step, the screws continue to rotate. The ram 30 can remain lowered or it can take another position (for example, a raised position or an intermediate position).

In an embodiment of the mixing process, the mixing process also includes a step of raising the ram. During this step, the screws 18 continue to rotate. New recipe components (for example, new raw materials, new masterbatches, etc.) can be introduced into the machine 10 during this step.

In an embodiment of the mixing process, the mixing process also includes a step of rotating the screws 18 in reverse with the movable doors closed. During this step, the screws 18 rotate in a direction opposite to the direction of rotation of the step of rotating the screws forward. The entire mixture located in the machine 10 has a downstream-upstream movement that will cause an additional distribution of raw materials.

In an embodiment of the mixing process, the mixing process also includes a step of completely closing the mobile sleeves 34, thus eliminating the gap between the sleeves 16 and the screws 18. This step includes either simultaneous or alternative tightening of the two mobile elements. During this step, the screws 18 continue to rotate. The ram 30 can remain lowered or it can take another position (for example, a raised position or an intermediate position).

In an embodiment of the mixing process, the movable doors are opened at the end of the mixing cycle. In this mode, the mobile sleeves 34 are in the closed position at the end of the mixing cycle.

The mixing process also includes a step of emptying the machine, during which the movable doors open to discharge the mixture from the outlet 25 of the machine 10 toward a downstream process. During this step, the screws 18 continue to rotate until the mixer 12 is completely emptied.

In embodiments of the machine 10 where the movable doors include two or more movable elements, the opening of the movable doors is carried out either partially or completely during this step (including the alternating opening). During this step, the ram is lowered, and the rollers 32 are rotated so as to allow the mixture to be discharged as sheets with selected thicknesses and widths. This step can be performed in embodiments that include a step of reintroducing the mixture.

In an embodiment of the mixing process, the mobile sleeves 34 can remain completely closed during this step. It is understood that they can be adjusted according to a volume of the mixture exiting the mixer. In this embodiment, the screws 18 continue to rotate during this step so as to completely empty the machine 10.

The mixing process also includes the step of shaping the mixture that is discharged from the mixer 12. After the step of emptying the machine 10 of the mixing process, the mixture exiting the mixer 12 can be shaped into a sheet 112 (see FIGS. 1 and 2). Through the movement of a known transport means (for example, the belt 116 of the cooling system) (see FIG. 2), the mixture is delivered directly in the form of a sheet from the rollers 32 toward a downstream process (that may be, for example, a palletizing process as shown in FIG. 2, a shaping process, and/or another mixing process and/or an extrusion process) (see arrow C in FIG. 2).

In a mixing process of the type including a mixing cycle performed by the system 1, another embodiment of the mixing cycle includes a cooling process performed by the cooling system after the end of a mixing process performed by the machine 10 (as described above). One or more cooling processes can be envisaged during a complete mixing cycle.

After the mixture has been discharged from the mixer 12 of the machine 10, a cooling process can be started. During this cooling process, the product circulates on the belts 114, 116, and it is cooled by passing under the spray bars before returning to the mixer 12.

The cooling process includes a step of circulating the sheet 112 from the machine 10 (see FIGS. 1 and 2). When the rollers 32 produce the mixture in the shape of sheet 112, the belts 114, 116 circulate the sheet in a processing direction at a respective spray station 102, 104 (the direction of circulation is indicated by arrow B in FIG. 1).

The cooling process also includes a step of spraying the sheet 112 with water. Depending on the unique properties of the mixture 112, each boom 102a, 104a sprays water at a predetermined rate. Each associated exhaust hood draws in air containing evaporated water at a predetermined air flow rate. The predetermined water and air intake flows may vary and may be different at each spray station, these flows being selected to provide the mixture with a target temperature and a target addition of water at the end of the current mixing cycle.

During the cooling process, the monitoring system can receive proportionate detection signals from the detection system. Depending on the actual water flow detected and/or the actual air intake flow detected, the monitoring system can predict an actual temperature of the rubber mixture and an actual addition of water at the end of the current mixing and cooling cycle. The prediction may include a prediction that the target temperature and the target addition of water will be attained or not. The monitoring system is configured to compare the target temperature and water addition values with respective predicted values.

At the end of the cooling process, when the mixture values representing the desired properties are attained, the cooling process includes a step of evacuating the sheet 112. During this step, thanks to the movement of the belt 116, the mixture is delivered directly in the form of a sheet from the rollers 32 toward a downstream process (as described above, for example, a palletizing process as shown in FIG. 2, a shaping process, and/or another mixing process and/or an extrusion process) (see arrow C in FIG. 2). Several cooling processes can be envisaged during a complete mixing and cooling cycle, as long as the desired temperature is not attained.

In a mixing process of the type including a mixing cycle performed by the system 1, another embodiment of a mixing cycle includes the simultaneous execution of mixing and cooling processes. In this embodiment, both processes are performed as described above. Both processes can be carried out continuously, or they can be delayed relative to each other until the mixture in the mixer 12 is completely discharged.

In this embodiment, the step of introducing the mixture can be performed by introducing into the introduction hopper 24 an already cooled mixture on the belt 114 (see arrow B in FIG. 1).

In this embodiment, between successive mixing cycles, the monitoring system can generate control signals so as to adjust the actual water flow rate and/or the actual air intake flow rate when a comparison indicates a non-equivalence. In this instance, the cooling process also includes a step of returning the already cooled mixture to the machine 10 in order to introduce again the mixture to the mixer 12. Thus, the mixing process is relaunched.

In this embodiment, the mixing cycle of the mixing process includes a step of iterative realization of one or more mixing processes and/or one or more cooling processes. This step can be performed until a comparison indicates equivalences between the target values and the predicted values of the mixture. Several cooling processes can be considered during a complete mixing and cooling cycle, as long as the desired temperature is not reached. At the end of the last cooling process, when the properties of the mixture attain the desired properties, the cooling process includes a step of evacuating the sheet 112. During this step, thanks to the movement of the belt 116, the mixture is delivered directly in the form of a sheet from the rollers 32 toward a downstream process (as described above in relation to the mixing process) (see arrow C in FIG. 2).

It is understood that each embodiment of a mixing cycle performed by the system 1 can be easily adapted for all embodiments of the system, including all embodiments of the machine 10 and all embodiments of the cooling system.

In all embodiments of the mixing cycle, the machine 10 (or a system that incorporates the machine 10) can be trained to recognize values representative of the mixture leaving the mixer 12 (for example, temperature and viscosity values) and to make a comparison with target values. This machine training includes the recognition of a non-equivalence between the compared values. Each step of the training can include a classification generated by self-learning means. This classification may include, without limitation, the parameters of the raw materials and masterbatches of the chosen mixing recipe, the screw configurations (either Archimedes or self-cleaning screws), the duration of the mixing cycles and the values expected at the end of a mixing cycle in progress (for example, the value of the space between the sleeves and the screws during the current mixing cycle, etc.).

It is understood that the system 1 may operate independently or that it may act as one or more of these systems that constitute a production plant.

It is envisaged that the machine 10 can carry out one or more processes concerning the plasticization of natural elastomers.

A mixing cycle (and each process of the mixing cycle) can be realized by PLC control and can include pre-programming of control information. For example, an adjustment of the mixing and cooling processes can be associated with the mixture that is supplied to the mixer 12, including the properties of the screws 18, the properties of the mixture entering the hopper 24 and the properties of the mixture discharged from the mixer. This adjustment can be used to prevent the opening and closing of the movable doors. This adjustment can also be used to prevent water flows from being delivered during one or more cooling processes.

For all of the embodiments of the system 1, at least part of an integrated surveillance system could be provided in a portable device such as a mobile network device (for example, a mobile phone, a portable computer, one or more portable devices connected to the network, including "augmented reality" and/or "virtual reality" devices, portable clothing connected to the network and/or any and all combinations and/or equivalents).

In some embodiments of the invention, the system 1 and/or a portion thereof may receive voice commands or other audio data representing, for example, a start or stop of the rotation of the screws 18 and/or a start or stop of one or more of the booms 102a, 104a. The request may include a request for the current status of a mixing cycle (including the current status of the mixing and cooling processes performed during the current cycle). A generated response can be represented in a manner that is audible, visual, tactile (for example, using a haptic interface), virtual, augmented and/or combinations and equivalents.

The invention preserves all the advantages of a mixer equipped with converging double conical screws. At the same time, the invention adapts to the industrial constraints that require machines to be efficient in terms of temperature (and also in terms of flow rate, pressure and working intensity) for all types of mixtures. The disclosed invention may also produce increasingly different types of mixtures.

The terms "at least one" and "one or more" are used interchangeably. The ranges that are presented as "between a and b" include the values "a" and "b".

Although specific embodiments of the disclosed apparatus have been illustrated and described, it is understood that various changes, additions and modifications can be made without departing from the spirit and scope of this disclosure. Therefore, no limitation should be imposed on the scope of the described invention with the exception of those set out in the annexed claims.

The invention claimed is:

1. A mixing and cooling system that performs a mixing cycle and manages temperatures of a rubber mixture, the mixing and cooling system comprising:
    a screw mixing and extrusion machine including:
        an introduction hopper having an inside;
        a mixer, the mixer being a converging conical twin-screw mixer having:
            sleeves in which two screws are mounted at an angle between an opening and an outlet, the opening being disposed upstream of the sleeves and connected to the introduction hopper for the introduction hopper to feed the two screws, the outlet being disposed downstream of the sleeves to discharge the rubber mixture at an end of a mixing process of the mixing cycle;

one or more motors coupled to the two screws to rotate the two screws in the sleeves during the mixing process;

one or more movable doors provided at the outlet and movable to allow, during the mixing process, the discharge and shaping of the rubber mixture; and one or more mobile sleeves that are arranged top-down towards the outlet and includes a surface that defines a mixing space between the surface and the two screws, the mobile sleeves linearly movable with respect to the outlet to adjust the mixing space between the sleeves and the two screws; and a ram with an inner surface having a shape that is complementary to an outer contour of the two screws, the ram moving along the inside of the introduction hopper;

a roller nose system including two counter-rotating rollers arranged just downstream of the outlet, the two counter-rotating rollers being positioned to oppose each other and form a sheet of the rubber mixture as the rubber mixture is discharged from the mixer; and a cooling system including:

at least one spray station that delivers water at a predetermined water flow rate to the sheet of the rubber mixture exiting the screw mixing and extrusion machine;

a suction station corresponding to each spray station that suctions air at a predetermined air flow rate; and at least one transport means that transports the sheet of the rubber mixture in a predetermined direction corresponding to a cooling process realized by the cooling system.

2. The mixing and cooling system of claim 1, wherein each spray station includes one or more spray booms positioned at a respective spray station, each boom being in communication with a water and air supply source that supplies water and air to one or more nozzles at a predetermined water flow and air pressure.

3. The mixing and cooling system of claim 1, wherein each spray station includes one or more nozzles configured to spray the water to produce atomized air droplets, and wherein the cooling system also includes:

a detection system including one or more sensors configured to detect, throughout the mixing cycle and the cooling process, an actual water flow, an actual air intake flow, and the presence at the correct pressure of the atomized air droplets in order to generate one or more corresponding signals; and a monitoring system include at least one programmable controller communicatively coupled to the detection system and configured to perform at least one of the following operations: prediction, comparison, and adjustment based upon the signals received from the detection system.

4. The mixing and cooling system of claim 1, wherein the one or more movable doors comprise sliding shutters installed with respect to the outlet so that the sliding shutters move linearly between a closed position, in which the sliding shutters prevent the rubber mixture from exiting the mixer, and an open position, in which the sliding shutters prevent the rubber mixture from escaping through the sides of the two counter-rotating rollers to force the rubber mixture to pass between the counter-rotating two rollers and to form the sheet of the rubber mixture with a predefined thickness and width.

5. The mixing and cooling system of claim 1, wherein the two screws are mounted in the mixer so that each screw thread tangentially contacts a surface of the opposite screw so that the two screws remain substantially in contact with each other when rotating the two screws at an angle and at a center distance that facilitates self-cleaning.

6. The mixing and cooling system of claim 5, wherein the two screws have an interpenetrated profile, a conjugate profile, or both.

7. The mixing and cooling system of claim 1, wherein the sleeves include cooling channels that manage the temperature of the rubber mixture during the mixing cycle.

8. A mixing and cooling process that includes a mixing cycle performed using the mixing and cooling system of claim 1, wherein the mixing cycle comprises at least one mixing process performed by the screw mixing and extrusion machine, and the mixing process includes the following steps:

a step of rotating the two screws in a forward direction with the one or more movable doors closed;

a step of introducing the rubber mixture into the screw mixing and extrusion machine, during which the two screws continue to rotate and the one or more movable doors remain closed;

a step of mixing a rubber mixture in the screw mixing and extrusion machine;

a step of emptying the screw mixing and extrusion machine, during which the one or more movable doors open to discharge the rubber mixture from the outlet and during which the two screws continue to rotate until the mixer is empty; and a step of shaping rubber mixture discharged from the mixer in the form of the sheet in order to deliver the rubber mixture toward a downstream process.

9. The mixing and cooling process of claim 8, in which the step of introducing the rubber mixture includes introducing raw materials to form the rubber mixture.

10. The mixing and cooling process of claim 8, in which the step of introducing the rubber mixture includes introducing one or more masterbatches.

11. The mixing and cooling process of claim 8, further comprising at least one cooling process carried out by the cooling system of the mixing and cooling system after the step of shaping rubber mixture discharged from the mixer, the cooling process including the following steps:

a step of circulating the sheet exiting the screw mixing and extrusion machine in a treatment direction at the level of at least one spray station;

a step of spraying the sheet in the vicinity of the spray station during the circulation of the sheet; and a step of evacuating air containing evaporated water.

12. The mixing and cooling process of claim 11, in which the cooling process further includes the following steps:

a step of detecting a water flow rate attained at an elapsed time during the cooling process;

a step of using the detected flow to predict temperature and added water values for the rubber mixture at the end of the current cooling cycle;

a step of comparing target and predicted values;

a step of adjusting the actual water flow rate so that properties of the mixture attain desired properties for the mixture; and a step of evacuating the sheet from the cooling system when the properties of the mixture attain the desired properties for the mixture.

13. The mixing and cooling process of claim 8, wherein the mixing process further includes a step of reintroducing rubber mixture into the mixer, during which the rubber mixture discharged from the mixer returns to the mixer through the introduction hopper.

14. The mixing and cooling process of claim 13, wherein the mixing process and the cooling process are executed simultaneously.

15. The mixing and cooling process of claim 8, wherein:

the one or more movable doors are in a closed position at a start of the mixing cycle and in an open position at the end of the mixing cycle; and the mobile sleeves are in an open position at the start of the mixing cycle and in a closed position at the end of the mixing cycle.

\* \* \* \* \*